United States Patent
Katzer et al.

(10) Patent No.: US 7,313,657 B1
(45) Date of Patent: Dec. 25, 2007

(54) CONFLICT AVOIDANCE IN DATA STORE REPLICATION

(75) Inventors: Robin D. Katzer, Olathe, KS (US); Carl J. Persson, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 311 days.

(21) Appl. No.: 11/088,660

(22) Filed: Mar. 24, 2005

(51) Int. Cl.
*G06F 12/00* (2006.01)
(52) U.S. Cl. .................................. 711/151
(58) Field of Classification Search ........... 711/114, 711/150, 151, 158, 162
See application file for complete search history.

(56) References Cited

U.S. PATENT DOCUMENTS

| | | | |
|---|---|---|---|
| 6,601,151 B1* | 7/2003 | Harris | 711/158 |
| 2004/0030739 A1* | 2/2004 | Yousefi'zadeh | 709/201 |
| 2004/0225847 A1* | 11/2004 | Wastlick et al. | 711/158 |

\* cited by examiner

*Primary Examiner*—Hiep T. Nguyen

(57) ABSTRACT

A conflict avoidance system is provided. The conflict avoidance system comprises a first data store provided at a first geographic location and a second data store at a second geographic location, where the first and second data stores are replications of one another. The conflict avoidance system also comprises a conflict avoidance module operable to receive a data store request from applications, wherein the conflict avoidance module communicates update data store requests to the first data store and communicates create data store requests and delete data store requests to the second data store.

17 Claims, 3 Drawing Sheets

CONFLICT AVOIDANCE IN DATA STORE REPLICATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to processing computer data stores, and more particularly, but not by way of limitation, to conflict avoidance in database replication.

BACKGROUND OF THE INVENTION

An enterprise data processing system may process multiple data store requests received from one or more entities. For example, a call center may process customer information to create, read, update, and delete customer records. These types of accesses may be referred to as CRUD operations. CRUD operations may be performed with respect to other data located in data stores. Some enterprise data may be considered mission critical. To preserve mission critical data, an enterprise may replicate the mission critical data at geographically separated sites to reduce the probability that a natural disaster or a catastrophic failure may destroy all or a significant portion of the mission critical data. Replication of mission critical data involves copying data from one data store to another data store, as for example when data is created, updated, or deleted.

SUMMARY OF THE INVENTION

According to one embodiment, a conflict avoidance system is provided. The conflict avoidance system comprises a first data store provided at a first geographic location and a second data store at a second geographic location, where the first and second data stores are replications of one another. The conflict avoidance system also comprises a conflict avoidance module operable to receive a data store request from applications, wherein the conflict avoidance module communicates update data store requests to the first data store and communicates create data store requests and delete data store requests to the second data store.

In another embodiment, a method of avoiding conflicts among replicated data stores is also provided. The method comprises communicating update data requests from a plurality of applications to the first data store and communicating delete and insert data requests from the plurality of applications to a second data store.

In still other embodiments, a data store conflict avoidance system is also provided. The data store conflict avoidance system comprises a conflict avoidance module operable to route a data request to one of a plurality of data stores based on a primary key associated with the data request.

These and other features and advantages will be more clearly understood from the following detailed description taken in conjunction with the accompanying drawings and claims.

BRIEF DESCRIPTION OF THE DRAWINGS

For a more complete understanding of the presentation and the advantages thereof, reference is now made to the following brief description, taken in connection with the accompanying drawings in detailed description, wherein like reference numerals represent like parts.

DETAILED DESCRIPTION OF THE PREFERRED EMBODIMENTS

Figure 1:
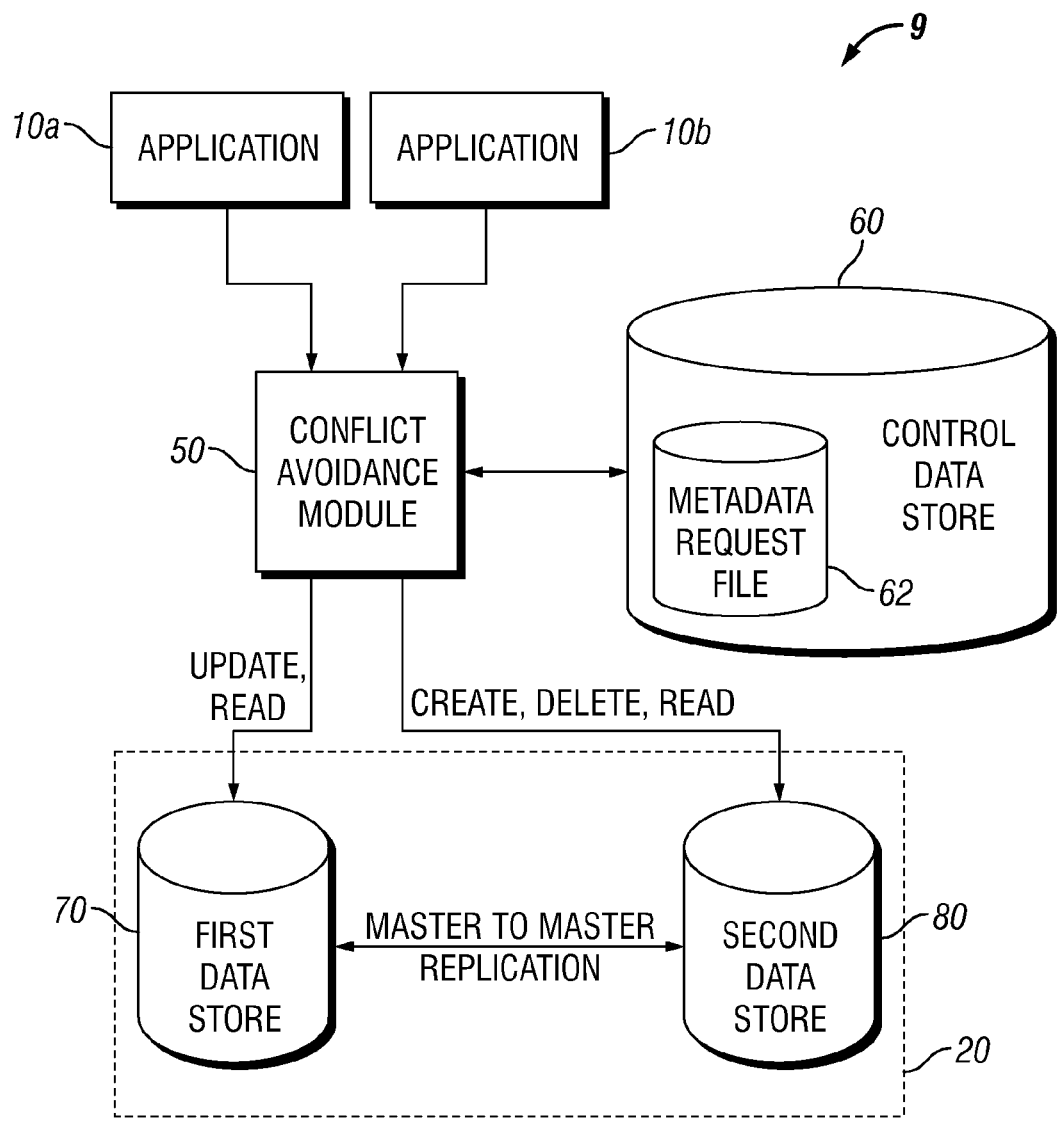
FIG. 1 is a block diagram of a conflict avoidance system for a replicated data store according to one embodiment of the present disclosure.

It should be understood at the outset that although an exemplary implementation of one embodiment of the present invention is illustrated below, the present system may be implemented using any number of techniques, whether currently known or in existence.

The present disclosure should in no way be limited to the exemplary implementations, drawings, and techniques illustrated below, including the exemplary design and implementation illustrated and described herein, but may be modified within the scope of the appended claims along with their full scope of equivalents.

Data store replication is commonly achieved by employing commercial-off-the-shelf (COTS) software packages. Such products may be known by a variety of names including data base replication, data base mirroring, and other names. When operations on the data are concurrently performed by multiple operators or users of applications, data conflicts may arise. For example, a first operator may update a first record in a first mirrored data store at the same time that a second operator updates the same first record in a second mirrored data store. This leads to the problem of which update to the first record should be replicated across the plurality of mirrored or replicated data stores. COTS data store replication packages may not provide a strategy for correcting the several data conflicts that may arise or the strategy provided may be of limited value to an enterprise. The present disclosure describes a data conflict avoidance system and method that obviates the problem of how to resolve data conflicts by preventing them from happening in many cases.

The data conflict problem generally occurs because CRUD operations and the associated replication of these operations across the mirrored or replicated data stores does not happen instantly. A first kind of data conflict may occur when a create operation creates a first data entry in a first data store, after which an update operation on the first data entry is attempted in a second data store before the first data entry is replicated from the first data store to the second data store, and the update operation fails. The create and update operations may be performed by a single operator in a single work session, but the operations may be performed on different data store systems, as for example in a load balancing system that distributes tasks to evenly load a number of data store systems. A second kind of data conflict may occur when a first update is performed on a second data entry on the first data store, then a second update is performed on the second data entry in the second data store, and then the first update of the second data entry in the first data store is replicated to the second data store, thereby overwriting and destroying the second update. A third kind of data conflict may occur when a third update is performed on a third data entry in the first data store, then a delete is performed on the third data entry in the second data store, and then the third update is replicated to the second data store creating either an error due to attempting to update a non-existent data entry or undoing the deletion and creating the third data entry in the second data store. A fourth kind of data conflict may occur when a second create is performed on the first data store to create a fourth data entry, a third create is performed on the second data store to create a fifth data entry, and both the fourth data entry and the fifth data entry are initiated with the same primary key, thereby violating a preference that each data entry in a data store employ a unique primary key. Other kinds of data conflicts are also possible.

Turning now to FIG. 1, a system 9 for data store conflict avoidance is depicted. A first application 10a and a second application 10b engage in create, read, update, and delete operations relative to mission critical data stored in a replicated data store 20. The replicated data store 20 comprises two or more geographically separated data stores including a first data store 70 and a second data store 80. In other embodiments, the replicated data stores may not be geographically separated and/or more than two data stores may be employed. A COTS data replication package provides master to master replication between the first and second data stores 70, 80. Create (which may also be referred to as insert), read, update, and delete requests from the applications 10 are directed to a conflict avoidance module 50. In one embodiment, the conflict avoidance module 50 routes all update requests to the first data store 70 and all create and delete requests to the second data store 80. The conflict avoidance module 50 routes read requests to both the first and second data stores 70, 80 according to a load balancing mechanism. This arrangement may be termed a first conflict avoidance mechanism and may avoid a substantial portion of the data conflicts.

When an application 10 interacts with a data entry, the application 10 may perform a succession of operations on that data entry before turning to other operations on other data entries. For example, the application may first create the data entry with default values. The application 10 may then update the data entry with input values. The application 10 may then update the data entry with a changed input value, as for example to correct a data entry error. The conflict avoidance module 50 may monitor work sessions based on a user identity, an application identity, and/or a data entry identity. During a work session, all update, insert, and delete requests are routed to the same data store, for example to the first data store 70. The information used by the conflict avoidance module 50 may be stored in a control data store 60, such as in a metadata request file 62. The work session or unit of work mechanism may be termed a second conflict avoidance mechanism and may avoid a substantial portion of the data conflicts that are not avoided by the first conflict avoidance mechanism. The first and second conflict avoidance mechanisms are complimentary. While it is preferred to use the first and second data stores 70 and 80 together, some of the same value may be captured by using either of the first and second data stores 70 and 80 independently.

In an exemplary work session, a user K updates a sixth data entry using the application 10a. A first work session or a first unit of work is associated with the user K and the application 10a. The conflict avoidance module 50 routes the request to update the sixth data entry to the first data store 70, which updates the sixth data entry. Later, while the first work session is deemed valid, user K deletes the sixth data entry using the application 10a. The conflict avoidance module 50 routes the delete request to the first data store 70. In this case, because the first work session is determined to exist and the previous data store operations were routed to the first data store 70, the subsequent data store operations are also routed to the first data store 70, even though this breaks the standard procedure of routing inserts and deletes to the second data store 80. Later, both the update and the deletion of the sixth data entry may be replicated to the second data store 80 according to the function of the replication COTS package. In some instances, the replication COTS package may replicate only the deletion of the sixth data entry, in other instances the replication COTS package may replicate the update and thereafter replicate the deletion of the sixth data entry to the second data store 80. The first work session or first unit of work is subsequently destroyed or marked invalid, on the event of the user K logging off, with the passage of a period of time with no further activity in the work session, or on some other event.

In another example, an operator Y may create a seventh data entry using the application 10a. A second work session or a second unit of work is associated with the operator Y and the application 10a. The conflict avoidance module 50 routes the create request to the second data store 80 which creates the seventh data entry. Later, while the second work session is deemed valid, the operator Y using the application 10a updates the seventh data entry, and the conflict avoidance module 50 routes the request to the second data store 80. In this case, because the second work session is determined to exist and the previous data store operations were routed to the second data store 80, the subsequent data store operations are also routed to the second data store 80, even though this breaks the standard procedure of routing updates to the first data store 70. Thereafter the create and the update are replicated from the second data store 80 to the first data store by the replication COTS package. The second work session or second unit of work is subsequently destroyed or marked invalid by the conflict avoidance module 50.

The conflict avoidance module 50 may segregate create, read, update, and delete data requests on the replicated data store 20 on the basis of primary keys. For example, data requests for all data entries associated with an even numbered primary key may be routed to the first data store 70 and data requests for all data entries associated with an odd numbered primary key may be routed to the second data store 80. This mechanism may be referred to as a third conflict avoidance mechanism. The third conflict avoidance mechanism may employ other segregation rules, for example segregating data entries having a primary key whose two low order digits are in the range 0 to 49 from data entries having a primary key whose two low order digits are in the range 50 to 99. The third conflict avoidance mechanism may be viewed as a hashing method and is readily adapted to the replicated data store 20 that has more than two data stores. The conflict avoidance module 50 may be said to hash the primary key of the data entry to the appropriate data store 70, 80. The replication COTS package assures that data operations in any data store 70, 80 will be replicated to the other data stores, there by providing the desired security for the mission critical data.

Figure 2:
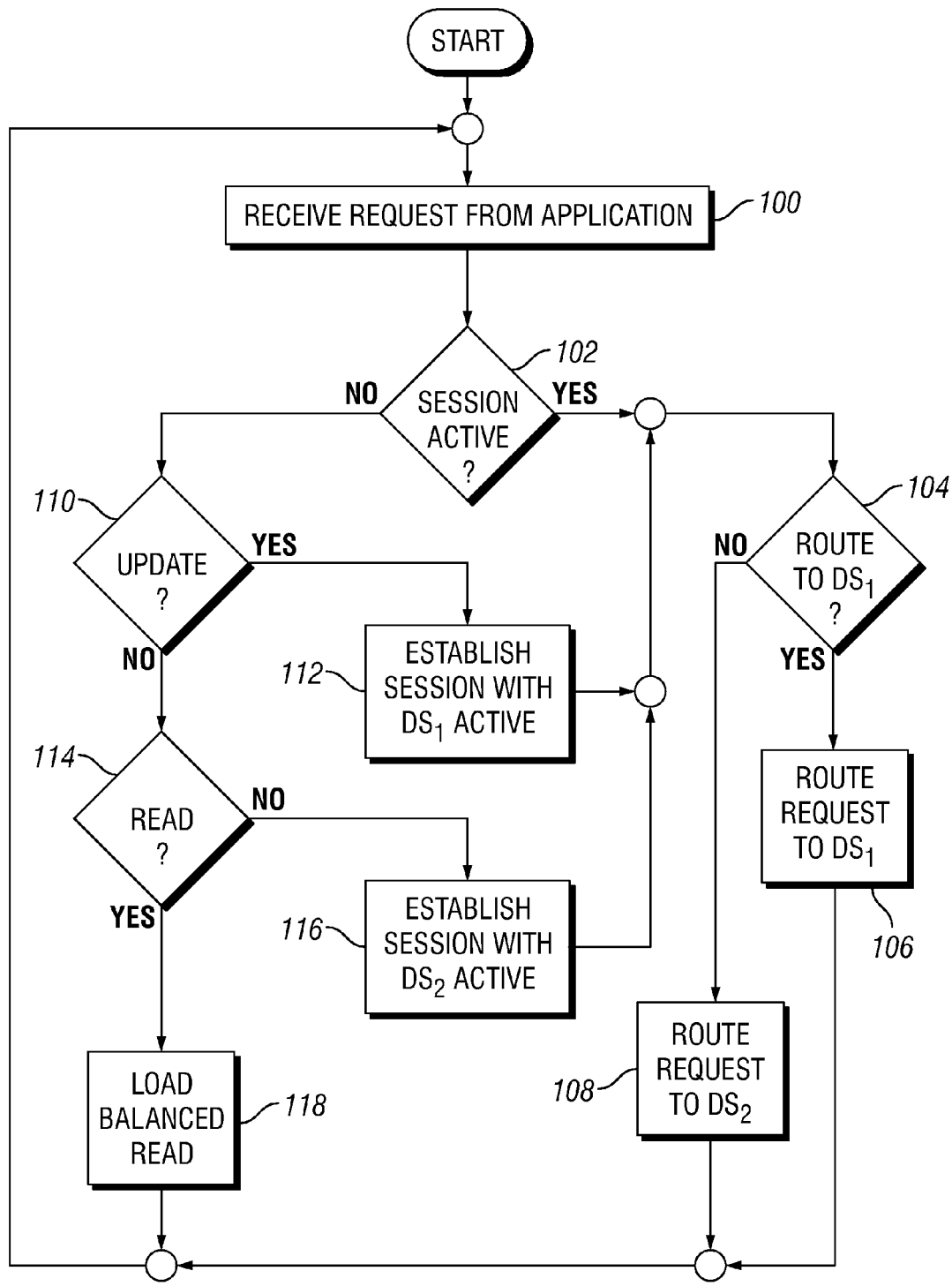
FIG. 2 is a flow diagram of a method for avoiding conflicts in replicated data stores according to one embodiment of the present disclosure.

Turning now to FIG. 2, a flow diagram illustrates a method for conflict avoidance that is based on the first and second conflict avoidance mechanisms described above. In block 100, a data request involving mission critical data is received from the application 10. The method proceeds to block 102 where if a work session or unit of work is valid for the data request, the method proceeds to block 104. In block 104, if the work session is defined to route data requests to the first data store 70, the method proceeds to block 106. In block 106, the conflict avoidance module 50 routes the data request to the first data store 70. In block 104, if the work session is defined to route data requests to the second data store 80, the method proceeds to block 108. In block 108, the conflict avoidance module 50 routes the data request to the second data store 80. The method returns to block 100.

In block 102, if a work session is not valid, the method proceeds to block 110. If the application 10 requests an update, the method proceeds to block 112 where a work session or unit of work is created by the conflict avoidance module 50, as for example creating a work session entry in the metadata request file 62 in the control data store 60, defining the first data store 70 to be active with respect to the work session entry. The method proceeds to block 104. In block 110 if the application 10 does not request an update, the method proceeds to block 114.

In block 114, if the application 10 does not request a read, the method proceeds to block 116 where a work session or unit of work is created by the conflict avoidance, module 50 defining the second data store 80 to be active with respect to the work session. The method proceeds to block 104. If the application 10 requests a read, the method proceeds to block 118 where a load balanced read is accomplished in the selected data store 70, 80. The method proceeds to block 100. The method may continue to loop until conflict avoidance module 50 is removed from service.

In alternate methods, reads or other operations may no be load balanced. When the reads are load balanced, the load balancing may be based on reads alone or may be used to balance unequal loads between the number of non-read actions being send to alternate data stores. For example, if an average update takes 2-times as long as inserts or deletes and 4-times as long as reads, but there are on average 3-times as many inserts and deletes as updates, then the default load balance could send 3 reads to up the update data store for every 2 reads send to the insert/delete data store.

Figure 3:
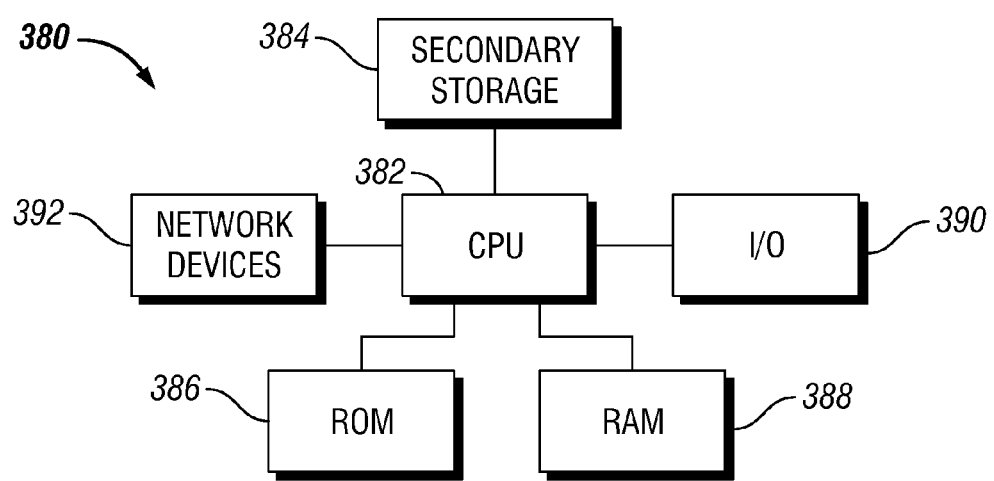
FIG. 3 is a block diagram of a computing system operable for implementing the several embodiments of the present disclosure.

The system 9 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What we claim as our invention is:

1. A conflict avoidance system, comprising,
   a first data store;
   a second data store, the first and second data stores defined as replications of one another;
   a conflict avoidance module operable to receive a data store request from a plurality of applications;
   a rule used by the conflict avoidance module, the conflict avoidance module operable based on a default of the rule to communicate an update data store requests from one of the applications to the first data store and further based on the default of the rule to communicate a create data store request and a delete data store request from one of the applications to the second data store.

2. The system of claim 1, wherein the rule further includes a work unit rule used by the conflict avoidance module in response to receiving a data store request to define a unit of work associated with the data store request, to associate the unit of work with one of the data stores based on the data store request, and to route subsequent data store requests associated with the unit of work to the associated data store, the unit of work including an identifier.

3. The system of claim 2, wherein the identifier is provided by one of the applications to associate related data store requests.

4. The system of claim 2, wherein the conflict avoidance module is further operable to destroy the unit of work after a time period has expired during which no data requests are received associated with the unit of work.

5. The system of claim 2, wherein the conflict avoidance module associates data store requests with the unit of work based at least in part on an identify of one of the applications.

6. The system of claim 2, wherein the conflict avoidance module associates data store requests with the unit of work based at least in part on a primary key of a data store entry.

7. The system of claim 2, wherein conflict avoidance module associates data store requests with the unit of work based at least in part on an identity of a user employing one of the applications.

8. The system of claim 1, wherein the data store requests are further defined as insert, read, update, delete.

9. The system of claim 1, wherein the rule further includes a load balancing rule used by the conflict avoidance module to distribute read requests to the first and second data stores according to a load balancing mechanism.

10. The system of claim 1, further comprising a replication component operable to replicate data between one or more data stores.

11. The system of claim 1, wherein the a first data store is provided at a first geographic location and the second data store is provided at a second geographic location.

12. A method of avoiding conflicts in replicated data stores, the method comprising:
    determining a type of request received from a plurality of applications;
    communicating update type data requests from the plurality of applications to the first data store; and
    communicating delete and insert type data requests from the plurality of applications to a second data store.

13. The method of claim 12, further comprising:
    occasionally replicating data from the first data store to the second data store; and
    occasionally replicating data from the second data store to the first data store.

14. The method of claim 12, further comprising:
    defining a unit of work associated with a first data request, the unit of work identifying one of the data stores; and
    communicating subsequent requests associated with the unit of work to the data store identified by the unit of work until the unit of work expires or is destroyed.

15. The method of claim 14, wherein the unit of work is associated with the second data request based on at least one of an identify of the application, an identity of a user of the application, and a primary key of a data store entry.

16. The method of claim 14, further comprising:
    destroying the unit of work after the utility of the unit of work is lost.

17. The method of claim 14, further comprising:
    destroying the unit of work after a plurality of data requests are committed.

* * * * *